US010313403B2

(12) United States Patent
Ciofalo et al.

(10) Patent No.: US 10,313,403 B2
(45) Date of Patent: Jun. 4, 2019

(54) SYSTEMS AND METHODS FOR VIRTUAL INTERACTION

(71) Applicant: dopplet, Inc., Wilmington, DE (US)

(72) Inventors: Marco Ciofalo, Florence (IT); Fabio Viviani, South Barrington, IL (US)

(73) Assignee: dopplet, Inc., Wilmington, DE (US)

(*) Notice: Subject to any disclaimer, the term of this patent is extended or adjusted under 35 U.S.C. 154(b) by 107 days.

(21) Appl. No.: 15/070,207

(22) Filed: Mar. 15, 2016

(65) Prior Publication Data
US 2017/0272476 A1 Sep. 21, 2017

(51) Int. Cl.
G06F 3/048 (2013.01)
H04L 29/06 (2006.01)
G06F 3/0484 (2013.01)
G06F 17/30 (2006.01)
H04L 29/08 (2006.01)

(52) U.S. Cl.
CPC ........ H04L 65/403 (2013.01); G06F 3/04842 (2013.01); G06F 17/30203 (2013.01); H04L 67/06 (2013.01)

(58) Field of Classification Search
CPC ........................................... G06F 3/048
See application file for complete search history.

(56) References Cited

U.S. PATENT DOCUMENTS

| 6,144,938 | A | 11/2000 | Surace et al. |
| 6,800,031 | B2 | 10/2004 | Di Cesare |
| 7,284,202 | B1 | 10/2007 | Zenith |
| 9,318,113 | B2 | 4/2016 | Westby et al. |
| 2002/0010584 | A1* | 1/2002 | Schultz .............. G06F 3/16 704/270 |
| 2006/0155765 | A1 | 7/2006 | Takeuchi et al. |
| 2007/0067337 | A1 | 3/2007 | Morris et al. |

(Continued)

FOREIGN PATENT DOCUMENTS

| EP | 1772854 A1 | 4/2007 |
| WO | 0225627 A1 | 3/2002 |

OTHER PUBLICATIONS

International Search Report for Application No. PCT/US2017/022493 dated Jun. 28, 2017.

(Continued)

Primary Examiner — Pei Yong Weng
(74) Attorney, Agent, or Firm — Lerner, David, Littenberg, Krumholz & Mentlik, LLP

(57) ABSTRACT

A virtual interaction system for conducting a virtual interaction session between an end-user and a person of interest. The system may include a memory for storing data identifying a plurality of conversational interactions with the person of interest, user interface for receiving one or more inputs from the end-user, and processor coupled to the memory. The processor may be operable to receive an input including a text string representing one or more questions or statements directed to the person of interest; identify at least one stored conversational interaction including a question or statement associated with at least one question or statement of the input; using a link corresponding with the stored conversational interaction, access at least a portion of a file associated with the link from a remote data store; and cause the accessed file portion to be displayed on a device of the end-user.

19 Claims, 6 Drawing Sheets

100
Virtual Interaction System

(56) References Cited

U.S. PATENT DOCUMENTS

| | | |
|---|---|---|
| 2009/0112680 A1 | 4/2009 | Dovrath et al. |
| 2009/0292687 A1 | 11/2009 | Fan et al. |
| 2010/0268716 A1 | 10/2010 | Degaugue et al. |
| 2012/0140904 A1 | 6/2012 | Li et al. |
| 2013/0018895 A1* | 1/2013 | Harless ............... G10L 15/1822 707/748 |
| 2013/0110520 A1 | 5/2013 | Cheyer et al. |
| 2014/0013230 A1 | 1/2014 | Malone |
| 2014/0036022 A1 | 2/2014 | Croen et al. |
| 2016/0057083 A1 | 2/2016 | Ciofalo et al. |

OTHER PUBLICATIONS

International Search Report and Written Opinion for Application No. PCT/US2015/046096 dated Oct. 29, 2015.

* cited by examiner

SYSTEMS AND METHODS FOR VIRTUAL INTERACTION

BACKGROUND

Fans can engage with celebrities using various media and forms of communication, such as a face-to-face encounter, meeting, chat forum, mail, social media, electronic mail and the like. However, celebrities generally find it difficult to interact with all of their fans due to their busy schedules, the impracticable task of responding to every single communication they receive within a reasonable amount of time, or other reasons. The fan may find the process and experience of interacting with a celebrity equally challenging and frustrating.

One way in which fans can engage with their favorite celebrities is by consuming online content featuring those celebrities. Online content often includes information that the fan would have asked the celebrity in a live, interactive discussion. However, watching, reading or listening to online content still lacks the feeling of actually interacting with the celebrity, since the online content is presented with the fan as a third-party observer and not in the context of a conversation between the celebrity and the fan.

SUMMARY

One aspect of the present disclosure is directed to a virtual interaction system for conducting a virtual interaction session between an end-user and a person of interest. The system may include memory for storing data identifying a plurality of conversational interactions with the person of interest, a user interface for receiving one or more inputs from the end-user, and a processor coupled to the memory. Each stored conversational interaction may include a question or statement directed to the person of interest, and a corresponding link identifying a file stored at a remote data store and including content featuring the person of interest and responsive to the question or statement. The processor may be operable to receive an input from the user interface, the received input including a text string representing one or more questions or statements directed to the person of interest. The processor may identify at least one stored conversational interaction including a question or statement associated with at least one question or statement of the input, and by using the link of the identified stored conversational interaction, may access at least a portion of the file identified by the link from the remote data store, thereby causing the accessed portion of the file to be displayed on a device of the end-user. In some examples, the file may be one of a video file, an audio file, and a text file.

In some examples, the processor may also perform one or more of the following operations: identify one or more stored conversational interactions associated with the input based on a semantic analysis of the input; determine how many questions or statements are associated with the input based on punctuation of the input, and identify a stored conversational interaction including a question or statement associated therewith for each identified question or statement; determine an order of first and second conversational interactions associated with a user input based on the input, access from the remote data store at least a portion of a first file associated with the first conversational interaction, and at least a portion of a second file associated with the second conversational interaction, and cause the accessed portions of the first and second files to be displayed on the device of the end-user in the determined order; receive an update comprising at least one of a new conversational interaction and a new link, and store the update in the memory, whereby the processor is subsequently capable of identifying the update as associated with an input.

In some examples, the memory may store a directory of synonyms and/or verb conjugations, and the processor may identify one or more stored conversational interactions associated with the input based on the directory. Additionally, or alternatively, the link stored in the memory may indicate a start time mark and a finish time mark of the file, such that the portion of the file beginning at the start time mark and ending at the finish time mark is accessed.

The system may further include a network interface. The processor may then output a request for the identified portion of the file over the network interface to the remote data store. In some examples, the memory, user interface, processor and network interface may be remote from the device of the end-user, and the request may include an identification of the device of the end-user and an instruction to provide the accessed portion of the file directly from the remote data store to the device. In other examples, the memory, user interface, processor and network interface may be integrated in the device of the end-user, and the accessed portion of the file may be caused to be provided to the device from the remote data store via the network interface, the processor then displaying the access portion of the file on the device.

Another aspect of the present disclosure is directed to method for conducting a virtual interaction session between an end-user and a person of interest. The method may involve: receiving an input including a text string representing one or more questions or statements directed to the person of interest, and accessing an electronic directory storing one or more conversational interactions. Each conversational interaction may include a question or statement directed to the person of interest and a corresponding link identifying a file that is stored at a remote data store and that includes content that features the person of interest. The content may be responsive to the question or statement of the stored conversational interaction. The method may further involve using a processor to automatically identify at least one stored conversational interaction including a question or statement associated with at least one question or statement of the input, to access, from the remote data store, at least a portion of the file identified by the link of the identified stored conversational interaction, and to cause the accessed portion of the file to be displayed on a device of the end-user. In some examples, accessing at least a portion of the file may involve accessing at least a portion of one of a video file, an audio file, and a text file.

In some examples, questions or statements of the input and stored conversational interaction may be determined to be associated with one another based on one or more regular expressions. Additionally, or alternatively, where the input includes a plurality of questions or statements, the input may be parsed into said plurality of questions or statements, an order to the questions/statements may be identified, and for each question or statement, the accessed portions of video files are caused to be displayed on the device of the end-user based on the identified order. Parsing may be based on punctuation of the input. Additionally, or alternatively, at least one link stored in the electronic directory may indicate a starting point and an ending point of the file identified by the link, and accessing at least a portion of the file identified by the link may involve accessing the portion of the file between the starting point and the ending point.

In some examples, the method may involve the processor receiving an update request to store a new conversational interaction or a new link in the electronic directory, and updating the electronic directory in accordance with the update request. In such examples, the processor may be subsequently capable of identifying the new conversational interaction or new link as being associated with a question or statement of an input.

A further aspect of the present disclosure is directed to a computer-readable memory storage medium having program instructions encoded thereon configured to cause a processor to perform any of the methods described above and herein.

Yet a further aspect of the present disclosure is directed to a method of building a virtual interaction database for conducting a virtual interaction session between an end-user of the system and a person of interest. The method may involve uploading a text string to the virtual interaction database. The text string may include one or more keywords between the end-user and the person of interest. The method may further involve identifying a file stored remotely. The file may contain content featuring the person of interest having a conversational interaction in connection with the one or more keywords. The method may also involve uploading a link corresponding to the identified file to the virtual interaction database. The text string and link may be uploaded in association with one another such that receiving an input from an end-user associated with one or more keywords results in playback of the linked file to the end-user. In some examples, first and second time marks of the linked file may be identified. The first and second time marks nay indicate the beginning and subsequent ending of the conversational interaction featured in the content of the file. The time marks may similarly be uploaded in association with the link.

DETAILED DESCRIPTION

The systems and methods of the present disclosure utilize online content to provide realistic virtual interactions between celebrities (or other persons of interest) and their fans (or other end-users of the systems and methods). Because there is often a considerable volume of online content about a given celebrity, utilizing this online content in the context of the present disclosure allows for the celebrity to provide an abundance of relevant information to their fans. Of course, the systems and methods described herein do not preclude a celebrity from investing the time and effort to conduct a specialized question/answer session in order to create a library of specialized responses to potential questions that their fans may have. In some examples, the systems and methods presented herein may supplement a specialized question/answer session.

The type of online content available for a given celebrity may vary (e.g., videos, written text, audio only, etc.). For purposes of the present disclosure, the examples provided herein primarily involve videos, but these examples may similarly be applied using online audio or text content.

Figure 1:
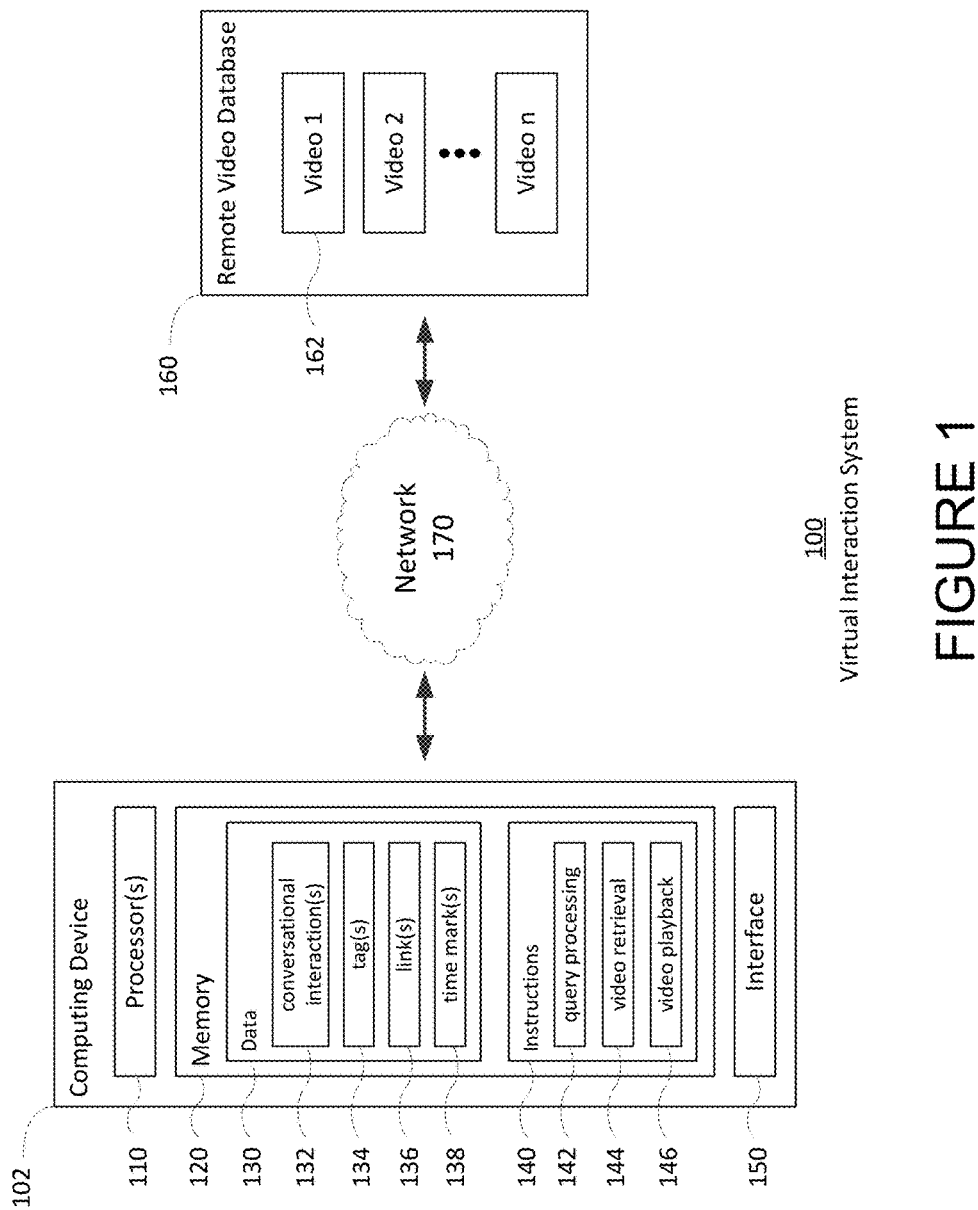
FIG. 1 is a diagram of a virtual interaction system in accordance with aspects of the disclosure.

FIG. 1 illustrates an example system 100 in accordance with aspects of the disclosure. The system 100 may include a plurality of computing devices, e.g., computing device 102, connected to network 170. The computing device 102 may include a plurality of components associated with a computer, such as one or more processors 110, memory 120 storing both data 130 and instructions 140, and an interface 150 including inputs (e.g., keypad, touchscreen, microphone, etc.) and outputs (e.g., display, speaker, etc.). The computing device 102 may be a desktop computer, laptop, smartphone, tablet, PDA, other mobile computing device, or a server. There may be one or more of these types of computing devices connected to the network 170.

The network 170 may be any type of network, wired or wireless, configured to facilitate the communication and transmission of data, instructions, etc. from one network component to a second network component. For example, the network 170 may be a local area network (LAN) based on at least Ethernet or other IEEE 802.03 LAN technologies, Wi-Fi based on at least IEEE 802.11 standards, wide area network (WAN), virtual private network (VPN), global area network (GAN), or any combination thereof. As such, the computing device 102 may connect to and communicate with the storage device 160 via the network 170.

The storage device 160 may be a component configured to store a large quantity of data. For example, the storage device 160 may be a collection of same or different storage components, or a mixed collection of storage components, such as ROM, RAM, hard-drives, solid-state drives, removable drives, network storage, virtual memory, multi-leveled cache, registers, etc. In addition, the storage device 160 may be configured so that it can be accessed by a server or other remote computing devices to provide data to various components connected to the network 170.

The storage device 160 provides for storage of data remote from the computing device 102. The storage device 160 may include a data store or data base of files, for example video files 162, audio files, or text files. One or more files may be requested over the network 170 by the computing device 102. The computing device 102 may locally store data utilized in making the request. For instance, the computing device 102 may locally store a web address or other link identifying a location at which the files are remotely stored, such that the request may be sent to the indicated address. The computing device 102 may also locally store markers indicating which portion of the remotely store file to request. For example, for a remotely stored video, audio or text file, the locally stored markers may be one or more time markers indicating a start time and end time (or beginning point and ending point of a text string) of the portion of the requested file.

In response to the request, the storage device 160 may provide the requested file(s) to the computing device 102 over the network 170. In some cases, the storage device 160 may be a collection of servers storing files, such as for a file sharing website. In other cases, the storage device 160 may be another computing device connected to the network 170. In any of these cases, the files stored at the storage device 160 may be regularly updated or uploaded, such that new data (e.g., new videos, new audio recordings, new text, etc.) may be made available from the storage device 160.

In the example of FIG. 1, only one storage device 160 is shown. However, in other examples, the computing device 102 may access several storage devices over the network 170 using, for instance, web addresses locally stored at the computing device. Thus, the computing device 102 is capable of causing content from multiple sources to be displayed to a user in a single interface, thereby making the content appear to have come from a single source.

With attention to the computing device 102, the processor 110 of the computing device 102 may be configured to enable a user of the computing device 102 to conduct a virtual interaction session. A virtual interaction session may involve the user carrying on a dialogue with a virtual version of a person of interest that the user is interested in, such as a celebrity. The dialogue may involve any combination of typed and spoken words. The particular embodiments described herein relate to a user inputting typed or spoken words, and a virtual version of a celebrity responding to the user's input with a video response. The video response may be stored as a video file, or part of a video file, at the storage device 160. However, in other cases, the celebrity may respond with audio or printed words (e.g., if the celebrity is a well known speaker, author or columnist with a large quantity of typed works stored at the storage device 160). Thus, the computing device 102 may also be thought of as a virtual interaction system.

The processor 110 may instruct the other components of computing device 102 to perform tasks based on the processing of various types of information. The processor 110 may be hardware that performs one or more operations. By way of example only, one or more control units (not shown) coupled to an arithmetic logic unit (ALU) (not shown) and memory 120 may direct the computing device 102 to carry out program instructions 130 stored in memory 120 at a particular clock rate. The processor 110 may be any standard processor, such as a central processing unit (CPU), or may be a dedicated processor, such as an application-specific integrated circuit (ASIC) or a field programmable gate array (FPGA). While one processor block is shown, the computing device 102 may also include multiple processors which may or may not operate in parallel.

Memory 120 stores information accessible by processor 110 including instructions 140 for execution by the processor 110 and data 130 which is retrieved, manipulated or stored by the processor 110. The memory 120 may be of any type capable of storing information accessible by the processor, such as a hard-drive, ROM, RAM, CD-ROM, write-capable, read-only, or the like.

Data 130 may be retrieved, stored or modified by processor 110. Although the invention is not limited by any particular data structure, the data 130 may be stored in computer registers, in a relational database as a table having a plurality of different fields and records, such as an XML. The data 130 may also be formatted in any computer readable format such as, but not limited to, binary values, ASCII or EBCDIC (Extended Binary-Coded Decimal Interchange Code). Moreover, any information sufficient to identify the relevant data may be stored, such as descriptive text, proprietary codes, pointers, or information which is used by a function to calculate the relevant data.

As an example, the data 130 may include conversational interactions 132, which can be stored video, audio, text, or other types of predetermined or predicted dialogues between individuals, such as question/answer dialogues between the user and the person of interest. Other dialogues may include salutations, small talk, or even non-verbal communications (e.g., in the case of video, waving or shrugging one's shoulders, in the case of text, emojis or symbols).

The data may also include tags 134. Tags 134 may be used to determine whether a particular query of the user is related to conversational interaction 132 is related to a given question or corresponding answer of a conversational interaction 132.

The data further also include links 136. A link 136 may also be associated with a particular conversational interaction 132, and may specify the location of a video file (or other file) responsive to the question of the conversational interaction 132. Then the video file stored at the link may be retrieved. Retrieving the video file may enable playback of the video recording contained in the file to the user, thereby answering the user's query or otherwise responding to the user's input.

A link 136 may be a link to a full video file, in which case the entire video file is responsive to the user's input. Alternatively, the link 136 may be a link to a portion of the video file. For instance, it is possible that the linked video is 10 minutes long and contains content relating to multiple subjects, but that only ten seconds of the video contains content relating to the user's input. In such a case, the link may define a starting point and ending point within the video file (e.g., a video clip starting at the 2:31 mark and ending at the 2:41 mark), such that only the portion of the video responsive to the user's input is retrieved. As a further alternative, instead of the stored link 136 indicating the starting and ending marks of a video file, the starting and ending time marks 138 may be separately stored and used to play back only a portion of the retrieved video file.

The instructions 140 may include any set of instructions to be executed directly (such as machine code) or indirectly (such as scripts) by the processor 110. In that regard, the terms "instructions," "steps" and "programs" may be used interchangeably herein.

The instructions 140 may include one or more set of executable instructions that enable a virtual interaction session with a person of interest, such as a celebrity, to be conducted. This may include instructions for query processing 142, in which the user's input is processed to determine a query entered by the user. Queries may include questions that the user asks the person of interest, as well as other statements, salutations, or comments made in the course of ordinary conversation (generally referred to herein as "conversational interactions"). The query processing may involve performing analysis on the user's input by which the input is matched to one or more particular conversational interactions 132 stored in the memory 120.

Query processing may involve determining how may queries are presented in a single input. Such determinations may be made, for instance, based on the punctuation in the input, whereby punctuation marks may be indicative of a break between queries. For example, if a user inputs: "Hi! How are you?" the input may be interpreted as two separate queries: Hi; and How are you. Thus, a video in which the person of interest says "Hello" may be retrieved in response to the first question, and a video in which the person of interest says "I am fine" may be retrieved in response to the second question. The videos may then be played back to the user in order as a complete response to the user's input.

Query processing may also involve semantic analysis of the input. For instance, the semantic analysis may identify a meaning of one or more keywords, e.g., pronouns associated with nouns that may be used by the user, such as "I," "you,"

"he," "she," "it," "that," etc. In this regard, when the user uses a particular keyword, e.g., a pronoun, to refer to an associated noun, the processor 110 may recognize the user's reference to the associated noun in order to maintain the conversational interaction and consistency between the user and the celebrity. For example, a user may ask a celebrity, "Didn't you recently take a trip to France?" The keywords associated with "a trip" or "France" may be a pronoun, "it," or "that." These keywords and associated nouns (or any portion of the user input) may be temporarily stored in cache to be later identified in subsequent questions and conversations. As such, when the user subsequently asks the celebrity "How was it?" the computing device 110, for example, identifies the term "it" to mean the "trip" or "France." It should be understood that the keywords may include be any part of speech that can be associated with one or more portions of the user input.

In addition to substituting terms based on their previous use in conversation, terms may also be substituted for synonyms (e.g., substitute "car" in place of "auto," or "lemon" in place of "citrus," or vice versa) or verb conjugations (e.g., "cook" in place of "cooked" or vice versa). Term substitutions may be based, for example, on one or more databases (e.g., thesaurus, custom database of world knowledge, etc.) which a user may create or purchase. Such databases may be stored with the data 130 of the memory 120.

The above query processing may be helpful for completing analysis of the user input and thereby matching the query(s) of the user input with one or more associated stored conversational interactions. In one case, the matching may be performed by comparing the words of the user input to the stored tags 134. If words of the user input match a stored conversational interaction 132, then the user input may be determined to correspond to that conversational interaction 132. In another case, the determination may identify an input and stored conversational interaction 132 that are similar to one another (e.g., based on tags, synonyms, conjugated verbs, or other related terms). The similarities may be determined using regular expressions.

Instructions for video (or other file) retrieval 144 may also be included. Video retrieval 144 may involve transmitting a request for an identified video file (or a portion thereof) over the network 170.

For a computing device 102 that also functions as a video playing device for the user, instructions for video (or other file) playback 146 may also be included Video playback 146 may involve display of the video with its associated audio using the interface (e.g., display, speaker) of the computing device 102.

The data 130 and instructions 140 may be included in a program that is installed on the computing device 102 and executed by the processor 110. Thus, in some examples, the user may have access to the computing device 102 but may only access a front-end of the program. In such a case, the data 130 and instructions 140 may be updated and maintained from a back-end of the program, which may be accessible to the person of interest, e.g., celebrity. As new videos or other online content about the celebrity is posted (either by the celebrity or by others), the celebrity can update the data 130 to include new links 136 to the new online content. In the process of creating a new link 136, the celebrity may replace a link in a previously created conversational interaction 132 with the new link. Alternatively, the celebrity may create a new conversational interaction 132 and incorporate the new link 136 into the new conversational interaction 132, all of which may also be added to the data 130. The celebrity may create the new link and/or conversational interaction from one location, and the program stored on the user's computing device 102 may then be updated over the network 170.

Alternatively or additionally, new links and/or conversational interactions may be created by anyone with access to the program. In such an alternative, fans of the celebrity who have access to the program may be encouraged to create new conversational interactions and link new online content concerning the celebrity to the newly created conversational interactions. In this regard, the celebrity's fans may be relied on to crowdsource information in order to produce a more realistic and thorough virtual interaction session with the celebrity.

In the example of FIG. 1, the virtual interaction system is shown as a locally installed program on a single computing device 102 that accesses data (e.g., video files) stored in remote locations. In such an example, the processor 110, memory 120 and interface 150 may all be housed in a common device housing. The device housing may also contain such user interfaces as a microphone and keypad for receiving user inputs, and a display for displaying retrieved videos.

However, in other examples, the virtual interaction session may be a program that is run on the user's personal computing device from a remote location. In such an example, the user may still have a device on which user inputs are received and retrieved video files are played to the user, but the conversational interactions, links, and other instructions may be stored remotely. For instance, the virtual interaction system may be executed from the user's device as an online application. The online application may also be stored remotely, separately from the remote video database.

Remote storage of the entire virtual interaction program may be beneficial for updating the database of conversational interactions. First of all, the conversational interactions may be accessed and updated online from any location and/or any authorized device. Furthermore, once the online database is updated, any user utilizing the virtual interaction program may immediately access the updated information with need to first download it to their own personal computing device.

Figure 2:
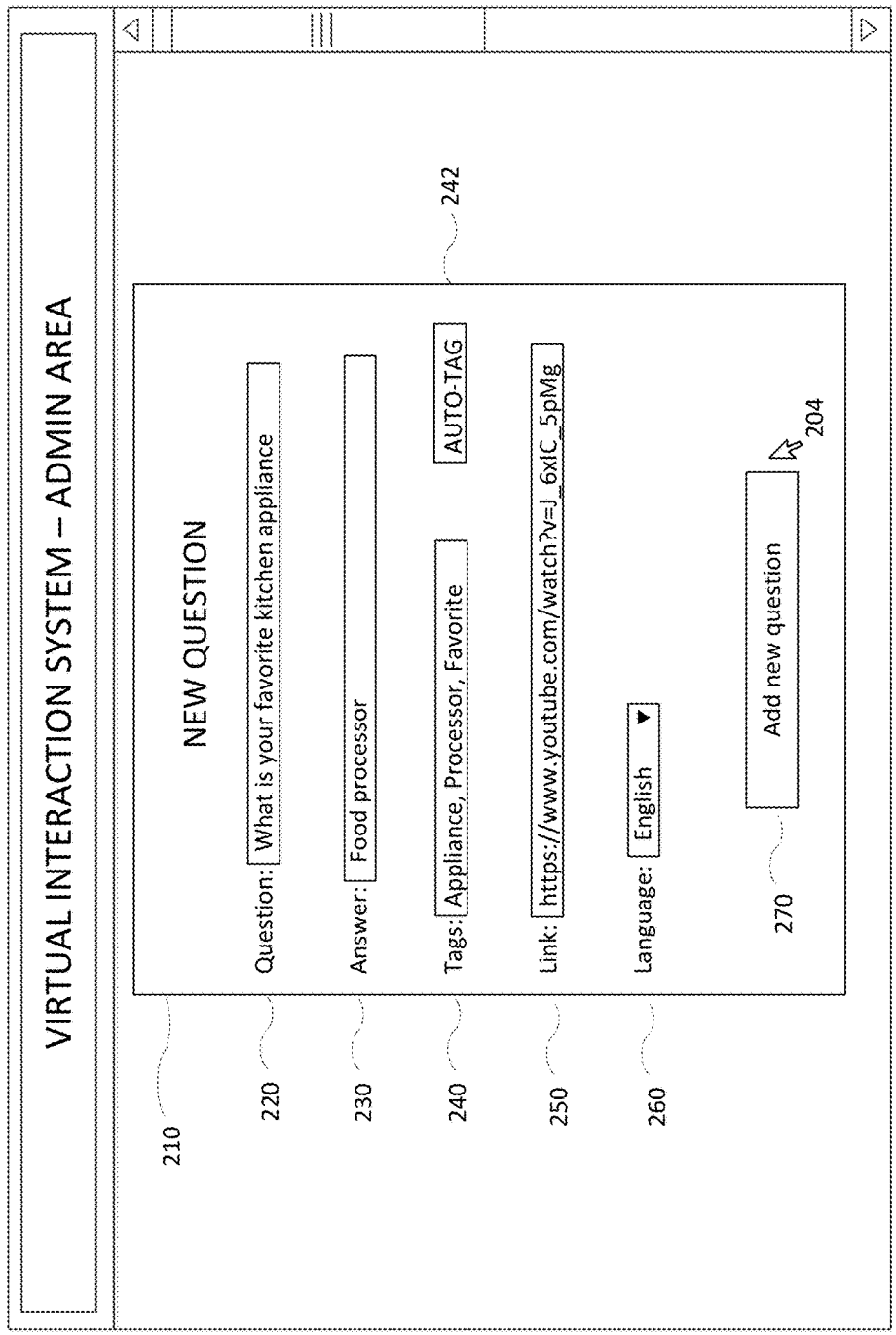
FIG. 2 is an example screenshot of a back-end interface of the virtual interaction system in accordance with aspects of the disclosure.

FIG. 2 shows an example of a newly stored conversational interaction by illustration of a user interface 202 for a software back-end 200 of the system 100. As explained above, the back-end interface may be an online application or a locally installed program. The user-interface may be accessed (e.g., by the celebrity, by a fan having access to the back-end of the program, etc.) in order to input predetermined or predicted conversational interactions, such as predicted questions, as well as answers to those predicted questions. One example of such a predicted question is new question 210. Box 220 includes text relating to the predicted questions ("What is your favorite kitchen appliance?"). Box 230 includes text related to the person of interest's answer to the predicted question ("My favorite kitchen appliance is the food processor."). Box 240 includes a list of one or more tags. Box 250 includes text indicating a link (e.g., hyperlink) to a video accessible over the network (e.g., via web browser) that may contain content that is responsive or otherwise relevant to the question 210 identified in box 220. Box 260 includes a selection of language, identifying the spoken language in the video identified by the link in box 250. Boxes 240, 250 and 260 are discussed in greater detail below.

Once the boxes (or at least the question and link boxes) have been completed, button 270 may be selected (e.g., by touchscreen, using cursor 204, etc) to save the question 210 and add it to memory 120.

With regard to box 240, the tags listed in box 240 may be words or terms relating to the predicted question and/or corresponding answer ("Appliance," "Processor," "Favorite"). Although the tags are do not identically match the question in box 220, if the tags are similar enough to the question (or the corresponding answer), then the answer 230 may be deemed relevant to the user's query. For instance, in the example of FIG. 2, if a user were to enter "What do you think of food processors?" or "Do you have any favorites?," the answer to question 210 would be relevant to those queries. Since the queries include the words "Processor" and "Favorite," respectively, question 210 may be identified as relevant to the user's queries based on the tags 240, even though the user's queries and question 210 are not exactly the same question.

The system may further provide auto-tag services, e.g., by clicking on button 242. The auto-tag feature may determine appropriate tags based on other inputs from the user, such as the text entered in boxes 220 and 230. In the example of FIG. 2, the tags are limited to single words, but in other cases may be phrases or even symbols or numbers.

With regard to box 250, as described above, the link may be a link to an entire video file or to a portion of a video file. The link may indicated the particular portion of the video file that is responsive to the user's query by indicating a starting time and ending time (either or both of which may occur in the middle of the video). If only a portion of the video file is linked, then retrieval of the video file may be limited to retrieval of the linked portion of the video file. Such limited retrieval is advantageous for reducing the amount of downloaded data in order to carry out the methods of the present disclosure.

In some cases, the question 210 may include space for multiple links 250, such that multiple videos may played in response to the question in box 220. The multiple links may be ordered in a predetermined sequence, such that the video associated with one link is played with the video associated with the other link. In such cases, playback of the first video to a user may result directly in playback of the second video, and playback of the second video may result in playback of a third video, and so on. For example, if a user input asks "Do you have any dance moves that you like?", a first video may be played in which the person of interest responds "Let me show you some of my favorite moves," then a second video may immediately play in which the person of interest demonstrates a first dance move, after which a third video plays in which the person of interest demonstrates another dance move, and so on.

With regard to box 260, knowledge of the spoken language of a linked video file or video clip may be used to determine the relevance of the clip to the user's query. In some cases, the video may be considered responsive to a query only if the video and query are the same language. For instance, if the query is in English, but the video is in Italian, it may be assumed that the user would not understand the content of the video, and thus the video would not be useful to the user as a response to the user's query. In other cases, the identified language may be used to select between two videos of equal or similar relevance. For instance, if the query is in English, and there are two videos that are relevant to the query, one in English and one in Italian, it may be assumed that the video in English should be retrieved since there is a greater likelihood of the user understanding the content of that video than the user understanding the content of the video in Italian.

As shown in FIG. 2, the example back-end interface 200 is not only accessible to a variety of users, including the person of interest and/or fans, but also user-friendly. A user can access the interface via a locally installed or remotely accessed application (e.g., web application), and may fill in boxes 220, 230, 240, 250 and 260 simply by clicking on the box (e.g., with a cursor) and entering a text string.

In summary, the back-end interface 200 of FIG. 2 provides an efficient and user-friendly way to maintain a robust and up-to-date directory of content for a virtual interaction session with a person of interest. Furthermore, instead of first coming up with questions for the person of interest, and subsequently requiring the person of interest to conduct a time consuming question-and-answer session in order to collect answers to the predetermined questions, the back-end interface 200 of the present disclosure allows for the content of the person of interest to first be created (often with little to no extra expenditure of time or effort on the part of the person of interest), for relevant questions to be recognized, inferred, or otherwise reverse engineered from the already-created content, and for the conversational interactions to then be created based on those identified relevant questions. For example, if the person of interest is a celebrity chef with a televised cooking show or online series of cooking demonstrations, the celebrity chef may reveal their interests or recent activities during a taped cooking session. The taped cooking session may then be posted as a video online, making the session accessible to all of the celebrity chef's fans. The celebrity chef, fan or a group of fans, may then add conversational interactions to the virtual interaction program, thereby linking the uploaded video to various questions to which the information revealed in the posted video is relevant.

Figure 3A:
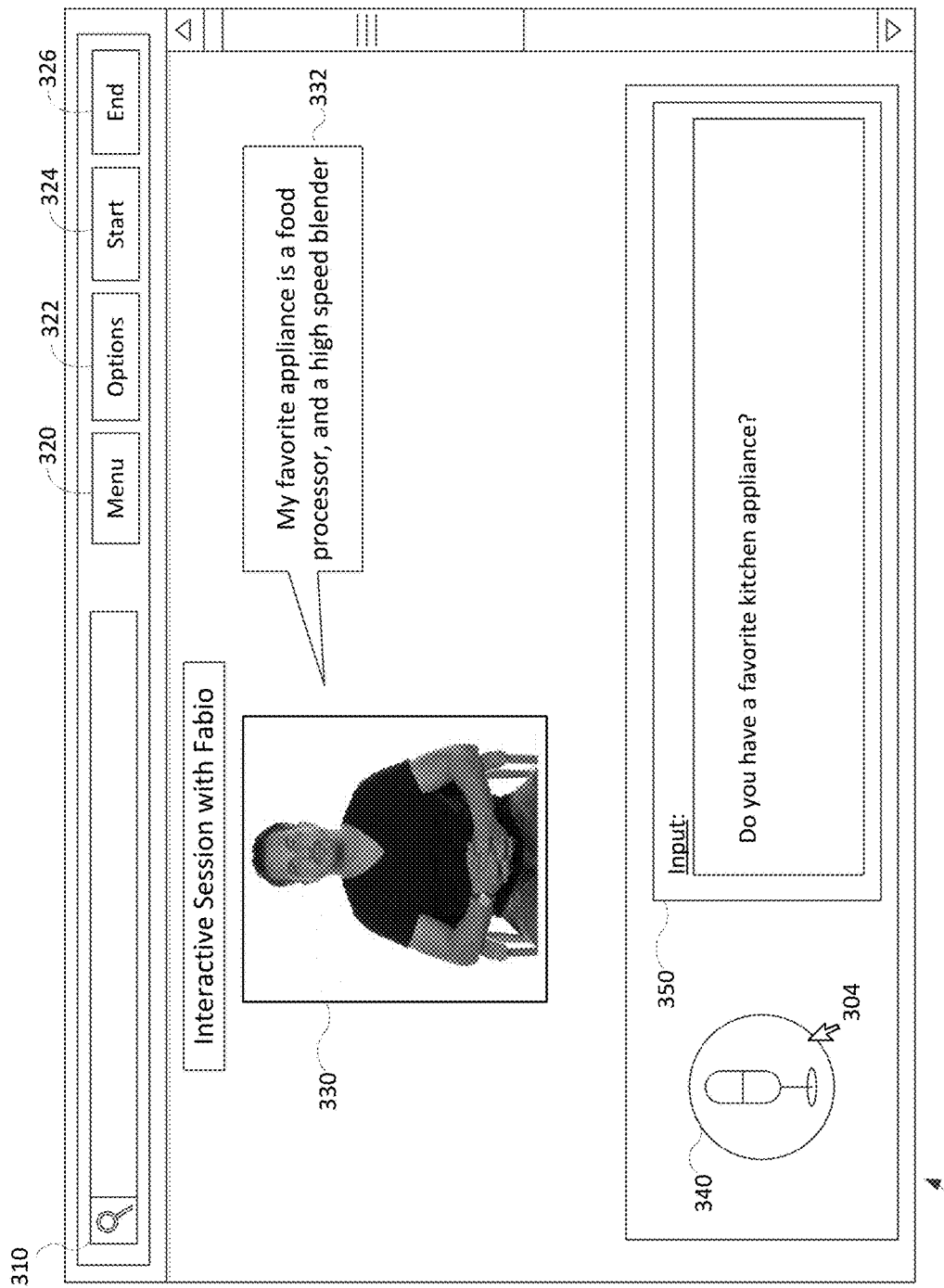
FIG. 3A is an example screenshot of an interactive interface of the virtual interaction system in accordance with aspects of the disclosure.
Figure 3B:
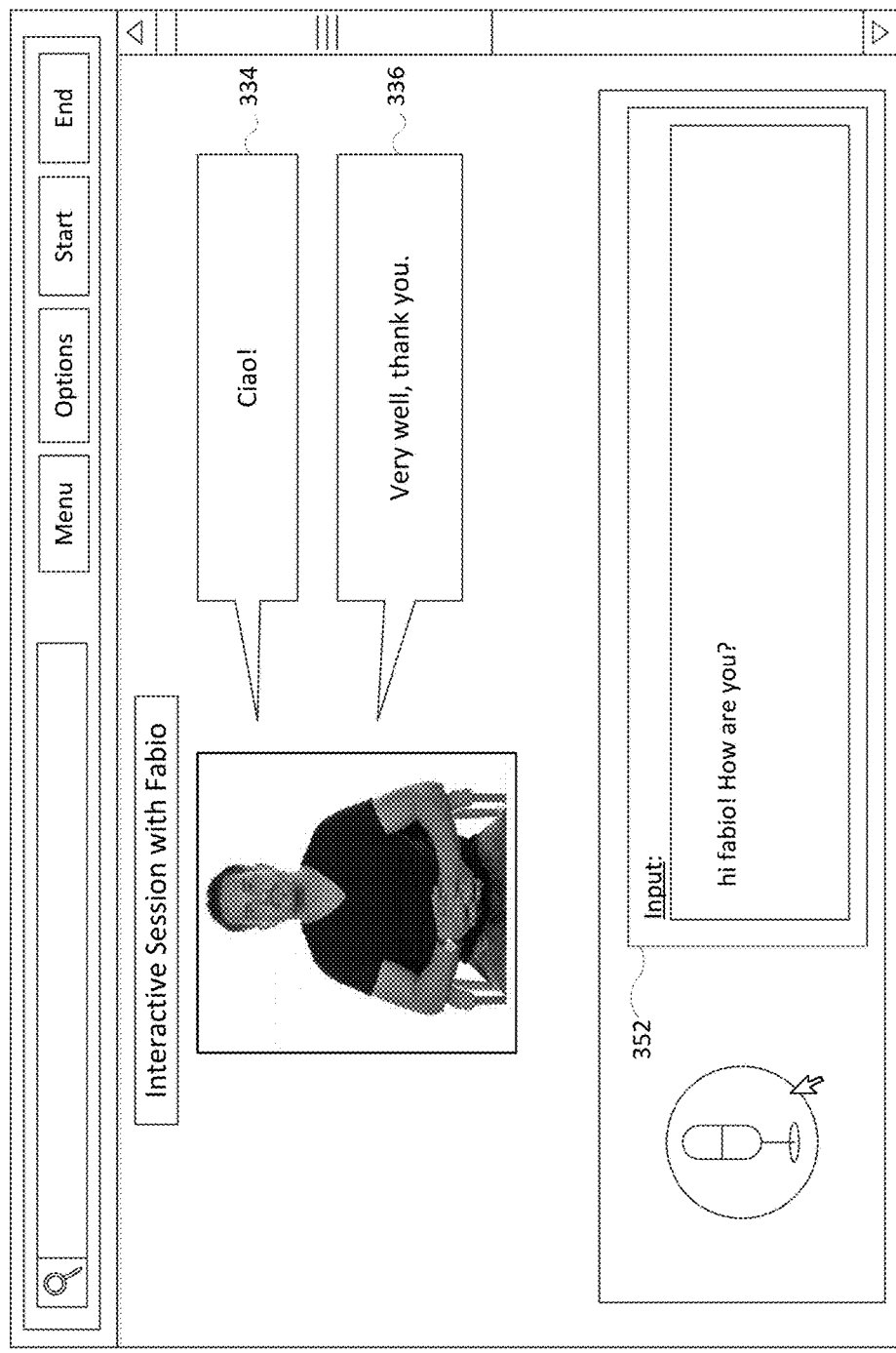
FIG. 3B is another example screenshot of an interactive interface of the virtual interaction system in accordance with aspects of the disclosure.

FIGS. 3A and 3B show examples of a front-end interface 300 of a virtual interaction program in accordance with the disclosure. By way of example, screenshot 302 of the front-end interface 300 of FIG. 3A includes a search field 310 for searching for a particular person of interest (in the example of FIG. 3A, Fabio Viviani), a menu button 320 for opening a menu of the program, options button 322 for selecting options relating to operation of the program, start button 324 for starting an virtual interaction session, and end button 326 for ending the virtual interaction session. Upon starting a virtual interaction session, an image, video, or other visual representations of the person of interest may be rendered on the screen in box 330. A dialogue box 332 (which may be accompanied by audio) may also be rendered on the screen. In order to interact with the person of interest, the user may use cursor 304 click a speech input button 340 (and then speak into a microphone) or text input box 350 (and then input text into the box).

The front-end interface 300 may be displayed on a display of a computing device belonging to the user. In the example of FIG. 3A, a user input is displayed in text input box 350, asking the person of interest "Do you have a favorite kitchen appliance." As noted above, the input may alternatively be spoken into a microphone of the computing device. In response, the processor of the computing device associates the question asked by the user with question 210 (either due to the similarity in the text input and question box 220, or due to the presence of certain tags 240 in text input box 350. by a video shown in box 330, and/or audio played out of a speaker of the computing device. In response, the processor retrieves an answer to the text in text input box 330, which is the video (or portion of a video) linked using link 250 and thereby associated with question 210. Also as noted above, the answer may be presented in the dialogue box 332 (e.g., a transcription of the played video, a written answer stored as part of question 210). In this example, the text box reads: "My favorite appliance is a food processor, and a high speed blender."

The example of FIG. 3B is similar to that of FIG. 3A, except that in FIG. 3B, two videos are played in box 330 instead of just one video. The processor of the computing device may determine the number of videos to be played based on an analysis of the user's input. For instance, punctuation of the user input may be tracked, where each punctuation mark indicates the end of one user input and the start of a next user input. Thus, in the example of FIG. 3B, the user input in text box 352 ("hi Fabio! How are you?") may be divided into two inputs: (a) hi Fabio!; and (b) How are you?, and separate responses may be retrieved and played for each input, preferably in the order in which the inputs are entered. In the example of FIG. 3B, a first video (associated with text box 334), in which the person of interest, Fabio, says "Ciao!," is played in response to the first input "hi Fabio!" A second video (associate with text box 336), in which Fabio says "Very well, thank you," is played in response to the second input "How are you?"

The example systems described above may be operated and maintained using the methods described herein. It should be understood that the following operations do not have to be performed in the precise order described below. Rather, various operations can be handled in a different order, or simultaneously. Moreover, operations may be added or omitted.

Figure 4:
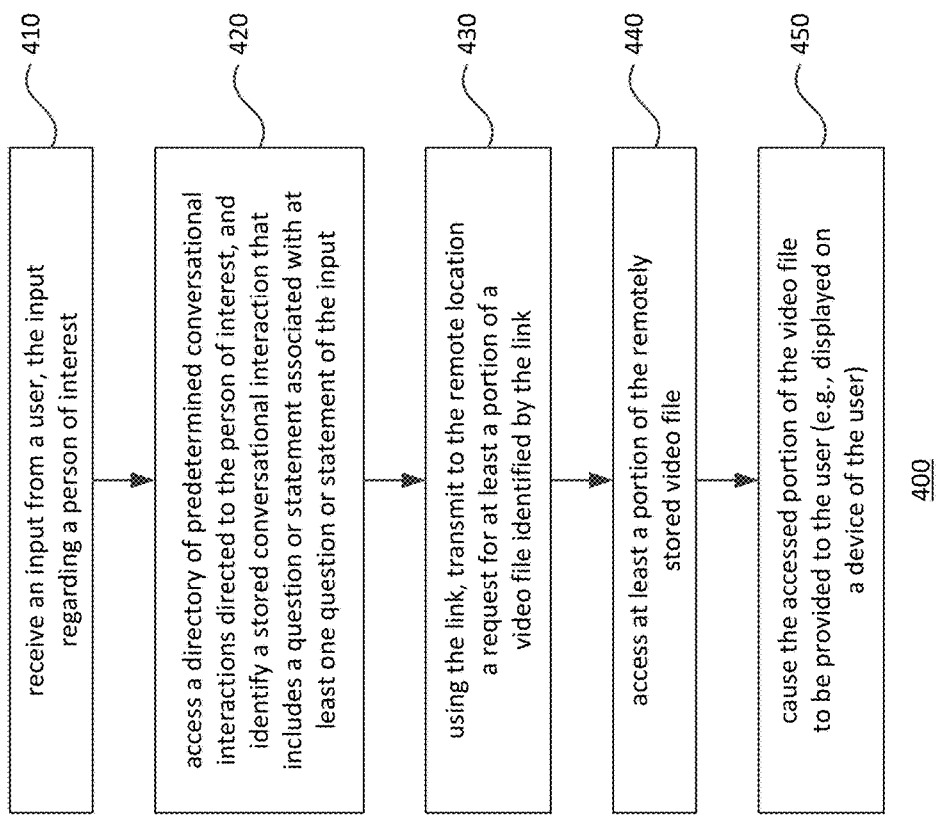
FIG. 4 is an example flow diagram in accordance with aspects of the disclosure.

FIG. 4 is an example flow diagram 400 of a virtual interaction session in accordance with an aspect of the disclosure.

At 410, the processor (e.g., processor 110 of computing device 102 in FIG. 1) receives an input from the user interface. The input may be have inputted by the user and may include a text string representing one or more questions or statements regarding a person of interest, such as a celebrity. As noted above, the input may be spoken or typed by the user.

At 420, the processor accesses a directory of predetermined conversational interactions (e.g., questions, statements) directed to the person of interest, and identifies a stored conversational interaction that includes a question or statement associated with at least one question or statement of the input. The identification may be performed using natural language processing and/or a semantic analysis of the input. The directory may be locally stored with the processor. For each predetermined conversational interaction stored in the directory, there may be one or more corresponding links to online or otherwise remotely stored content featuring the person of interest and responsive to the question or statement of the conversational interaction. For instance, each link may include a web address identifying a remote online location at which the content is stored. Thus, the directory may associate the input received at 410 with one or more such remotely stored video files.

In some cases, it is possible that the processor determines that there is no predetermined conversational interaction that is associate with the user input, or that at least a part of the user input has no associated predetermined conversational interaction. In such cases, the processor may provide an error message to the user, indicating that no response to the question is available. The error message may itself be a recorded video of the person of interest providing some response that indicates to the user that the person of interest has not or cannot answer the question (e.g., a video of the person of interest saying "I don't know" or shrugging their shoulders). Alternatively, the processor may search outside of the directory of conversational interactions for a video. The search may be performed by accessing videos in one or more remote, third-party databases, searching the videos for text, and determining whether the identified text includes terms and/or phrases that are similar to terms and/or phrases in the text of the user input. Searching a video may involve converting spoken audio of the video into a text string. Searching a video may additionally, or alternatively, involve searching a webpage of the video (e.g., HTML) for text. As with identifying results from the directory, semantic analysis and/or natural language processing may be used identifying results from third-party databases.

At 430, using the corresponding link of the identified stored conversational interaction, the processor transmits to the remote location a request for at least a portion of a video file identified by the link (and thereby associated with the input).

At 440, the processor accesses at least a portion of the remotely stored video file. The processor may locally store information, such as one or more markers corresponding to timestamps of the video file, indicating what portion of the file to access. For instance, one marker may indicate a beginning time of the portion of video file to be accessed, and another marker may indicate an ending time for that portion. In this manner, the markers may indicate the portion of the video file (between the starting and ending points) that is relevant to the question or statement of the stored conversational interaction (and thereby, to the associated user input). In such a case, only the portion of the video file between the starting and ending points is accessed.

At 450, the accessed portion of the video file is caused to be provided to the user. Providing the accessed portion of the video file may involve displaying the portion of the video file on a device of the user.

In some examples, for instance if the virtual interaction program is a file locally installed on and executed from the end-user's personal computing device, the processor may send a request to the remote storage location, the request causing the accessed portion of the video file to be sent to the source of the request, i.e., the personal computing device of the user. Alternatively, if the virtual interaction program is executed from a location different than the personal computing device of the user, such as an online application, accessing the video file may involve requesting that the desired portion of the video file be sent directly to a location different than the source of the request. In this case, the processor may further include with the request an address associated with the personal computing device (e.g., an address of the device itself, an address of a data store associated with and accessible to the device, etc.)). In either case, the processor storing and executing the request for the video file may be considered to have "accessed" the video file (or portion thereof) and "caused" the accessed portion of the file to be displayed on the user's personal device in response to the user's input.

Providing the video file to the user may involve displaying content from the video file, such as in box 330 of the interface 302, and/or projecting audio associated with the video file. Providing content from the video file to the user may also involve presenting text (e.g., in box 332-336 of FIGS. 3A and 3B) on the interface 302. The text may be associated with the query in the directory (and retrieved therefrom), or transcribed from the retrieved video file.

In the example where the link indicates starting and ending points of a video file, only the portion of the video file between the starting and ending points may be played to the user (e.g., in box 330 of the interface 302).

As mentioned above, in other examples, the linked content may be a file other than a video file. For instance, the linked content may be an audio or text file. Such files may also be retrieved and provided to the user on an interface, as described above), and may similarly be retrieved in portions based on starting and ending points within a larger file, also as described above.

The method of FIG. 4 utilizes a vast array of online content to provide relevant responses to a user's queries from a person of interest to whom the queries are directed. Furthermore, the responses are generally presented to the user using video and/or audio featuring the person of interest, thereby simulating the look and feel of an interactive conversation with the person of interest.

Building on the capabilities of the virtual interaction system discussed above, the virtual interaction system may be easily maintained by the person of interest or by another individual simply by uploading videos to an online storage location, and further uploading links which associate predetermined queries with the uploaded videos.

Figure 5:
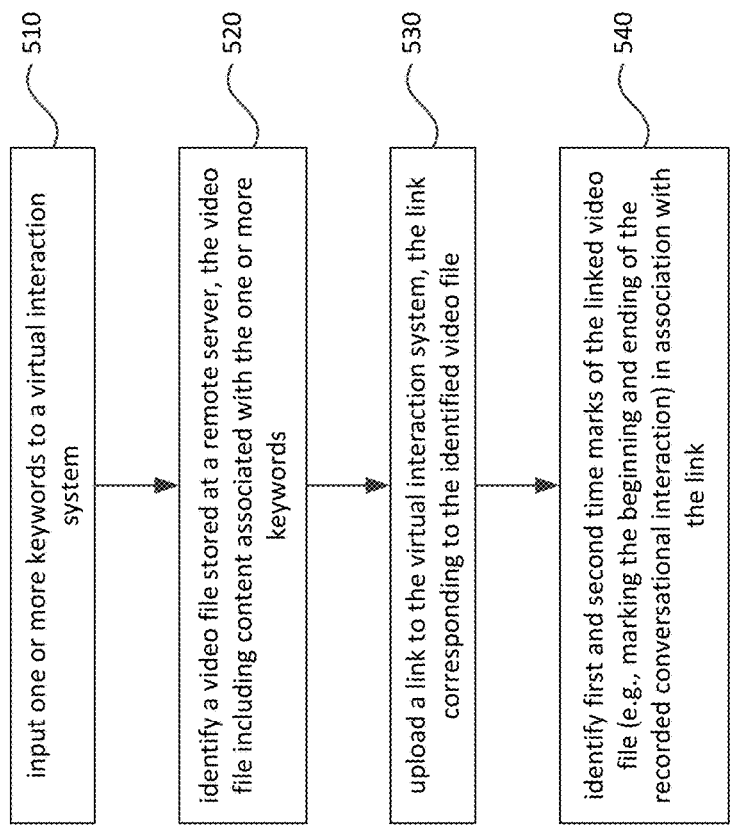
FIG. 5 is another example flow diagram in accordance with aspects of the disclosure.

FIG. 5 is a flow diagram 500 providing an example method for building a virtual interaction database. This may be done prior to receiving input from end users with questions for a particular celebrity. In other examples, the database may be built or updated dynamically as end user input is received.

At 510, one or more keywords are input to a virtual interaction system. The keywords may be, for example, embedded in a text string, such as a query or other conversational interaction between the user of the virtual interaction system and the person of interest. Where the database is being built in advance of receiving end user input, the keywords may be generated based on anticipated questions from an end user.

At 520, a video file stored at a remote server is identified, the video file including content associated with the keywords. The video file may contain a recording of the person of interest engaging in conversation or having some other conversational interaction in connection with the associated keywords. For example, where the text string includes a question, such as "What is your favorite food?" the identified video file may include a snippet with the person of interest explaining what he likes to cook at home. In some examples, the video file may be identified using one or more processors, such as by executing a search algorithm using keywords from the parsed text string or associated keywords.

At 530, a link is uploaded to the virtual interaction system, the link corresponding to the identified video file. The uploading of text strings and links may be done over the network interface.

At 540, first and second time marks of the linked video file are identified in association with the link. For example, the links and/or keywords may be tagged with time markers, or stored in a table or other relational data structure. The first and second time marks may mark the beginning and subsequent ending of the recorded conversational interaction featuring the person of interest in the video file.

With completion of the method of FIG. 5, user input including a text string with a particular question may be received, and a snippet from a video file stored at a remote server may be played in response, as described above in connection with FIG. 4. In this regard, interaction between a user and a virtual persona may be seamless. For example, a user input associated with the text string (e.g., asking the same or a similar query as is contained in the text string) may result in the linked video file being accessed, and playing back the recorded conversational interaction of the video file, beginning from the first time mark and ending with the second time mark. Thus, the user's query is answered (or otherwise responded to) by the played-back video.

As mentioned above, in some cases a user may input a question for which it is determined that there is no known file responsive to the user's input. In such cases, the user's input may be made available to the person of interest, for instance by storing the input in a section of the memory designated for unanswered questions, or by automatically creating a new question 210 and filling in the question 220 with the user input, but leaving the rest of the question blank 210. Optionally, a notification may be sent to the person of interest when such an input is stored. When the person of interest notices the stored unanswered input, he or she may proceed to record a video responding to the input, upload the recorded video, and then link the uploaded video to a question or statement of the user input, in the manner described in FIG. 5. Then, the next time a user asks a similar question, the virtual interaction system will be able to access a video that is responsive to the input.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A virtual interaction system for conducting a virtual interaction session between an end-user and a person of interest, the system comprising:
    a memory for storing a directory including a plurality of conversational interactions with the person of interest, each stored conversational interaction including a text string indicating a question or statement directed to the person of interest, a plurality of tags associated with the text string, and a corresponding link identifying an online content file stored at a remote data store and including content featuring the person of interest and responsive to the question or statement;
    a network interface for communication over a communications network between (i) the virtual interaction system and a device of the end-user, between (ii) the virtual interaction system and a device of the person of interest, and between (iii) the virtual interaction system and the remote data store; and
    a processor coupled to the memory and operable to:
        receive an input from the device of the end-user over the network interface, the received input including a text string representing one or more questions or statements directed to the person of interest;
        identify at least one stored conversational interaction in the directory including a question or statement associated with at least one question or statement of the input;
        using the link of the identified stored conversational interaction, accessing at least a portion of the online content file identified by the link from the remote data store;

causing the accessed portion of the online content file to be displayed on a device of the end-user;

in response to the received input, generating a new conversational interaction, the new conversational interaction including at least one question or statement of the input, the new conversational interaction being stored in the memory;

receiving a second input from the device of the person of interest over the network interface, the second input providing a new link for the new conversational interaction, the new link identifying an online content file stored at a remote data store and including content featuring the person of interest and responsive to the question or statement in the new conversational interaction; and upon receipt second input from the device of the person of interest over the network interface, adding the new conversational interaction to the directory of conversational interactions.

2. A system as recited in claim 1, wherein the processor is operable to identify one or more stored conversational interactions associated with the input based on a semantic analysis of the input.

3. A system as recited in claim 1, wherein the processor is operable to:
determine how many questions or statements are associated with the input based on punctuation of the input; and
for each identified question or statement of the input, identify a stored conversational interaction including a question or statement associated therewith.

4. A system as recited in claim 1, wherein the memory further stores a directory of synonyms and/or verb conjugations, and wherein the processor is operable to identify one or more stored conversational interactions associated with the input based on the directory.

5. A system as recited in claim 1, wherein, for a given input associated with at least a first and second conversational interaction, the processor is operable to:
determine an order of the first and second conversational interactions based on the user input;
access from the remote data store at least a portion of a first online content file associated with the first conversational interaction, and at least a portion of a second online content file associated with the second conversational interaction; and
cause the accessed portions of the first and second online content files to be displayed on the device of the end-user in the determined order.

6. A system as recited in claim 1, wherein the processor is operable to output a request for the identified portion of the online content file from the network interface to the remote data store over the communications network.

7. A system as recited in claim 6, wherein the memory, processor and network interface are remote from the device of the end-user, and wherein the request comprises an identification of the device of the end-user and an instruction to provide the accessed portion of the online content file directly from the remote data store to the device.

8. A system as recited in claim 6, wherein the memory, processor and network interface are integrated in the device of the end-user, and wherein the accessed portion of the online content file is caused to be provided to the device from the remote data store via the network interface, and wherein the processor is operable to display the access portion of the online content file on the device.

9. A system as recited in claim 1, wherein the link indicates a start time mark and a finish time mark of the online content file, wherein the portion of the online content file beginning at the start time mark and ending at the finish time mark is accessed.

10. A system as recited in claim 1, wherein said online content file is one of a video file, an audio file, and a text file.

11. A system as recited in claim 1, wherein the processor is operable to:
receive an update comprising at least one of a new conversational interaction and a new link; and
store the update in the memory, whereby the processor is subsequently capable of identifying the update as associated with an input.

12. A method for conducting a virtual interaction session between an end-user and a person of interest, the method being performed by a virtual interaction system having a network interface for communication over a communications network between (i) the virtual interaction system and a device of the end-user, between (ii) the virtual interaction system and a device of the person of interest, and between (iii) the virtual interaction system and a remote data store, the method comprising:
the virtual interaction system receiving an input from the device of the end-user over the communications network, the input including a text string representing one or more questions or statements directed to the person of interest;
the virtual interaction system accessing an electronic directory storing one or more conversational interactions, each stored conversational interaction including a question or statement directed to the person of interest, and a corresponding link identifying an online content file stored at the remote data store and including content that features the person of interest and is responsive to the question or statement of the stored conversational interaction;
a processor of the virtual interaction system automatically identifying at least one stored conversational interaction in the directory including a question or statement associated with at least one question or statement of the input;
the processor accessing, from the remote data store, at least a portion of the online content file identified by the link of the identified stored conversational interaction; and
the processor causing the accessed portion of the online content file to be displayed on a device of the end-user;
in response to the received input, the processor generating a new conversational interaction, the new conversational interaction including at least one question or statement of the input, the new conversational interaction being stored in the memory;
the processor receiving a second input from the device of the person of interest over the network interface, the second input providing a new link for the new conversational interaction, the new link identifying an online content file stored at a remote data store and including content featuring the person of interest and responsive to the question or statement in the new conversational interaction; and
upon receipt second input from the device of the person of interest over the network interface, the processor adding the new conversational interaction to the directory of conversational interactions.

13. A method as recited in claim 12, wherein the questions or statements of the input and stored conversational interaction are determined to be associated with one another based on one or more regular expressions.

14. A method as recited in claim 12, wherein the input comprises a plurality of questions or statements, the method further comprising:
    parsing the input into said plurality of questions or statements; and
    identifying an order of the plurality of questions or statements in the input,
    wherein the accessing and causing steps are performed for each question or statement, and wherein the accessed portions of video files are caused to be displayed on the device of the end-user based on the identified order.

15. A method as recited in claim 14, wherein parsing the input into said plurality of questions or statements is based on punctuation of the input.

16. A method as recited in claim 12, wherein at least one link stored in the electronic directory indicates a starting point and an ending point of the online content file identified by the link, wherein accessing at least a portion of the online content file identified by the link involves accessing the portion of the online content file between the starting point and the ending point.

17. A method as recited in claim 12, wherein accessing at least a portion of the online content file involves accessing at least a portion of one of a video file, an audio file, and a text file.

18. A method as recited in claim 12, further comprising:
    receiving, at the processor, an update request to store a new conversational interaction or a new link in the electronic directory; and
    the processor updating the electronic directory in accordance with the update request, whereby the processor is subsequently capable of identifying the new conversational interaction or new link as being associated with a question or statement of an input.

19. A method for building a virtual interaction database for conducting a virtual interaction session between an end-user of the system and a person of interest, the method comprising:
    receiving a text string from a device of the end-user to the virtual interaction database over a communications network, wherein the text string comprises one or more questions or statements directed from the end-user to the person of interest;
    storing the received text string in memory;
    transmitting a notification to a device of the person of interest indicating receipt of the text string from the device of the end-user;
    receiving a link from the device of the person of interest to the virtual interaction database over the communications network, the link corresponding to an online content file stored remotely from each of the device of the end-user, the device of the person of interest, and the virtual interaction database, the file containing content featuring the person of interest responding to a question or statement of the received text string;
    receiving from the device of the person of interest an indication of first and second time marks of the linked file, the first and second time marks indicating the beginning and subsequent ending of the conversational interaction featured in the content of the file; and
    storing the link and time marks in the memory, wherein the text string, link and time marks are stored in association with one another such that receiving an input from a second end-user associated with the text string results in playback of the linked file to the second end-user.

* * * * *